United States Patent Office 3,238,212
Patented Mar. 1, 1966

3,238,212
1 - SUBSTITUTED - 1 - PHENYL(OR SUBSTITUTED PHENYL) - 2 - [2 - METHYL - 6,7 - SUBSTITUTED - 1,2,3,4 - TETRAHYDROISOQUINOLINYL - (1)] ETHANES
Arnold Brossi, Riehen, and Alfred Rheiner, Jr., Binningen, Switzerland, assignors to Hoffmann-La Roche Inc., Nutley, N.J., a corporation of New Jersey
No Drawing. Filed Dec. 5, 1962, Ser. No. 242,368
Claims priority, application Switzerland, Dec. 15, 1961, 14,505/61
10 Claims. (Cl. 260—287)

The present invention relates, in general, to novel tetrahydroisoquinoline compounds and to a process for producing same. More particularly, the invention relates to tetrahydroisoquinoline compounds having the formula:

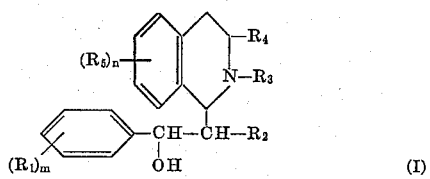

(I)

in which $R_1$ is an alkyl, alkoxy, aralkoxy, hydroxy, nitro, amino or halogen group or an alkylenedioxy group formed by two adjacent $R_1$ substituents; $R_2$ is hydrogen or lower alkyl; $R_4$ is hydrogen or lower alkyl; $R_3$ is alkyl, alkenyl or aralkyl; $R_5$ is alkyl, alkoxy, aralkoxy, hydroxy, nitro or halogen or an alkylenedioxy group formed by two adjacent $R_5$ substitutents; $m$ is 0 or the integer 1, 2 or 3; and $n$ is 0 or the integer 1, 2 or 3.

Additionally, the invention relates to ethers, esters and salts of such compounds and to methods for their production.

In the practice of this invention, a tetrahydroisoquinoline compound having the formula:

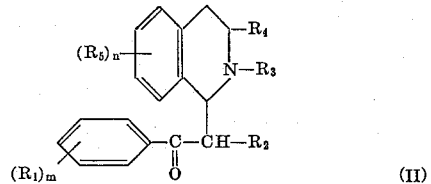

(II)

in which the symbols $R_1$, $R_2$, $R_3$, $R_4$, $R_5$, $m$ and $n$ have the same meanings as in Forumla I.

or a salt of such compound, is reduced, and, if desired, etherified or esterified. Where the base is obtained, this may be converted into a salt.

The alkyl groups which are in the foregoing formulas represented by the symbols $R_1$, $R_3$ and $R_5$ are lower alkyl groups such as methyl, ethyl, isopropyl, butyl or heptyl groups. The alkyl groups which are, in the foregoing formulas, represented by the symbols $R_2$ and $R_4$ are lower alkyl groups, preferably those having from 1 to 4 carbon atoms. Examples of the alkoxy and aralkoxy groups which are, in the foregoing formulas, represented by the symbols $R_1$ and $R_5$ are methoxy, ethoxy, propoxy, butoxy, etc., benzyloxy, phenethoxy, etc. The alkylenedioxy groups which, in the foregoing formulas, are represented by the symbols $R_1$ and $R_5$ include, for example, methylenedioxy, ethylenedioxy, etc. Moreover, the symbols $R_1$ and $R_5$ represent halogen atoms, such as, fluorine, chlorine, bromine and iodine. Vinyl, allyl, methallyl, dimethallyl, etc. and benzyl, phenethyl, etc. are examples of the alkenyl and aralkyl substituents which are represented by the symbol $R_3$. Moreover, where the symbols $m$ and $n$ represent the numerals 2 or 3, the $R_1$ and $R_5$ substituents can be the same or different.

The salts of the compounds of Formula II, mentioned heretofore, are acid addition salts with acids such as, mineral acids. For example, these salts include hydrohalide salts such as, hydrochloride salts, hydrobromide salts, as well as phosphate salts, sulfate salts, etc.

The ethers of the compounds of Formula I include, for example, alkyl ethers, such as, the methyl, ethyl and butyl ethers; alkenyl ethers, such as, the allyl ether; aralkyl ethers, such as, the benzyl and phenethyl ethers; and aryl ethers, such as, the phenyl ether.

The esters of the compounds of Formula I include those products which have, as the acyl group, an alkanoyl group, for example, an acetyl, propionyl, butyryl, pivaloyl, etc. group; an aralkanoyl group, for example, a phenacetyl group; or an aroyl group, for example, a benzoyl or substituted benzoyl group, such as a p-nitro benzoyl or veratroyl or trimethoxy benzyl group.

The starting material of Formula II can, for example, be prepared by condensing a dihydroisoquinolinium compound having the formula:

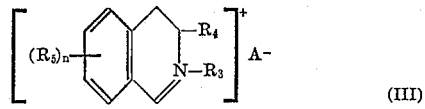

(III)

in which the symbol $A^-$ represents a monovalent anion and in which the symbols $n$, $R_3$, $R_4$ and $R_5$ have the same meanings as in Formula I
with a ketone having the formula:

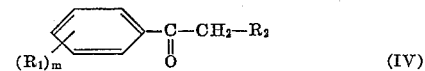

(IV)

in which the symbols $R_1$ $R_{,2}$ and $m$ have the same meanings as in Formula I
said condensation being carried out in the presence of a basic condensation agent. The condensation product may, if desired, be resolved into its optical antipodes and/or converted into a salt.

The dihydroisoquinolinium compounds of Formula III can, in turn, be obtained readily from the corresponding 3,4 - dihydroisoquinoline by treatment with a suitable quaternizing agent. The 3,4-dihydroisoquinoline compound, which is subjected to quaternization to obtain the 3,4-dihydroisoquinolinium compound, can be prepared by known methods. One such method comprises, for example, converting a suitably substituted β-phenethylamine into the formamide and cyclizing the compound, thus obtained, by the Bischler-Napieralski method. Additionally, the desired compound can be obtained either by reacting an alkenyl benzene, the alkylene linkage of which stands in conjugated relationship to the aromatic nucleus, with an imido halogenide or by reacting a 2-(β-bromoalkyl)-benzaldehyde with ammonia or hydroxylamine, with subsequent reduction of the N-oxide.

The reduction of the oxo group to a hydroxy group is, in the practice of the present invention, carried out by methods which are know per se. It is expedient, however, to accomplish the reduction of the starting material using an alkali metal-metal hydride, such as lithium aluminum hydride or, especially, sodium borohydride, potassium borohydride etc. A preferred method comprises carrying out the reduction using sodium borohydride, advantageously in the presence of a solevent which is stable in the presence of the reducing agent. Suitable solvents include, for example, methanol, ethanol and dimethylformamide. The reduction proceeds readily at low temperature, e.g., at a temperature ranging from about $-15°$ C. to about $+5°$ C. This reduction procedure, described herein, is suitable also when nitro groups or alkenyl groups are present, since these groups are not acted upon by the aforementioned reducing agents. After the reduction has been carried out, any aralkyloxy group, especially the benzyloxy group, can be cleaved readily by hydrogenolysis to provide free hydroxy groups. Such debenzylation is carried out, advantageously, catalytically, for example, in the presence of a noble metal catalyst, such as palladium on charcoal.

In an additional procedural step, the compound of Formula I can be etherified as esterified. The esters can be prepared by reacting a compound of Formula I with a conventional acylating agent. Suitable acylating agents include, for example, carboxylic acids, anhydrides, or halides. In preparing ethers, there may be used, for example, diazoalkanes, alkyl halides, alkenyl halides, aralkylhalides or arylhalides.

The reaction products obtained are basic, mostly crystalline compounds which form water-soluble salts when reacted with conventional inorganic and organic acids, for example, with hydrohalic acids such as, hydrochloric acid and hydrobromic acid or with sulfuric acid, phosphoric acid, tartaric acid, citric acid, etc.

Those tetrahydroisoquinoline compounds of Formula I, in which $R_2$ and $R_4$ represent hydrogen, contain two asymmetric carbon atoms. Accordingly, the formation of two stereoisomeric racemates is possible. If these racemates form concurrently, they can be separated by methods known per se, for example, by chromatography or by fractional crystallization. The racemates themselves can, if desired, be separated into their optical antipodes by methods known per se, for example, by fractional crystallization of the salts with optically active acids, such as d-tartaric acid, dibenzoyl-d-tartaric acid or d-camphorsulfonic acid. By reduction of a starting material of Formula II which is optically active, that is, a compound wherein the symbols $R_2$ and $R_4$ represent hydrogen, one proceeds directly to the optically active end product.

The end product of Formula I, in which $R_2$ and/or $R_4$ represents an alkyl group has 3 or 4 asymmetrical carbon atoms. Accordingly, the number of theoretically possible stereoisomeric racemates amounts to 4 or 8. The present invention embraces all possible racemates and their optical antipodes, as well as the production thereof.

The products of this invention possess valuable pharmacological properties. More specifically, the products are useful as analgesic, spasmolytic and antitussive agents. They can, therefore, be used as medicaments, for example, in the form of pharmaceutical preparations. These products, including the acid addition salts thereof, can be used as such or in a mixture with other compounds, and they can be embodied in a form suitable for enteral or parenteral administration. For example, the present products can be mixed with inert adjuvants, either inorganic or organic in nature, such as, water, gelatin, lactose, starch, magnesium stearate, talc, vegetable oils, gum, polyalkylene glycols, Vaseline, etc. These pharmaceutical preparations can be provided in the form of tablets, dragees, suppositories, or they can be incorporated in suitable capsules. Additionally, they may be provided in liquid form, for example, as solutions, suspensions or emulsions. If desired, the products can be stabilized and/or mixed with adjuvant materials, such as preservatives, stabilizers, wetting or emulsifying agents, salts for alternating osmotic pressure or buffers. If desired, they can be used also in admixture with other therapeutically valuable substances.

For a fuller understanding of the nature and objects of this invention, reference may be had to the following examples which are given merely as further illustrations of the invention and are not to be construed in a limiting sense.

*Example 1*

30.0 grams of 1-p-chlorophenacyl-2-methyl-6,7-dimethoxy-1,2,3,4-tetrahydroisoquinoline were dissolved in 1,000 ml. of methanol. To this solution there was added, in portions, a total of 6.0 grams of sodium borohydride. The addition of the sodium borohydride was carried out at 0° C. with constant stirring. The reaction mixture was allowed to stand at room temperature for a period of two hours after the evolution of hydrogen had ceased. Thereafter, the solvent was subsequently removed under a water jet vacuum. The residue was then mixed with water and the organic portion was taken up in 200 ml. of ether. The ether solution was decanted, allowed to stand for 15 hours with chilling and, subsequently, the crystalline product which separated from the solution was removed by filtration. In order to purify same, the product was recrystallized from ethyl acetate-petroleum ether. By this procedure there was obtained 1-hydroxy-1-p-chlorophenyl-2-[2 - methyl - 6,7 - dimethoxy - 1,2,3,4-tetrahydroisoquinolinyl-(1)]-ethane, in the form of one of its two stereoisomers, melting at 120–121° C. To obtain the second stereoisomer, the ether filtrate was concentrated, the residue was dissolved in acetone and added to a solution of 9.0 grams of water-free oxalic acid in acetone. After addition of ether, the second stereoisomer crystallized in the form of its acid oxalate, which after crystallization from methanol-ether, melted at 123–125° C. The acid oxalate was then treated with dilute sodium hydroxide, and after working up the reaction mixture by conventional procedures the free base was obtained as a colorless oil.

Additionally, the above-described stereoisomers were obtained by the reduction of the phenacyl compound, using lithium aluminum hydride in boiling tetrahydrofuran.

The starting material used in this example was prepared in the following manner:

18.0 grams of 2-methyl-6,7-dimethoxy-3,4-dihydroisoquinolinium-methyl sulfate (melting point 157° C.; prepared from 6,7-dimethoxy-3,4-dihydroisoquinoline and dimethyl sulfate in ethyl acetate solution) and 10.0 grams of p-chloroacetophenone were dissolved in 200 ml. of methanol. To this solution there was added 17 ml. of 3 N sodium hydroxide solution. The reaction mixture was then allowed to stand at room temperature for about 24 hours. After concentration of the reaction mixture in a water jet vacuum, the residue was mixed with dilute hydrochloric acid until Congo red in reaction. Thereafter, the reaction mixture was shaken with ether to remove the neutral portion. The aqueous hydrochloric acid solution was thereafter made alkali by the addition of soda solution. The product which separated from the solution was filtered, dried at room temperature over phosphorus pentoxide and, subsequently, crystallized from ethyl acetate-petroleum ether. There was obtained 17 grams of 1-(p-chlorophenacyl)-2-methyl-6,7-dimethoxy-1,2,3,4-tetrahydroisoquinoline having a melting point of 106–107° C. This product, in acetone, upon addition of alcoholic hydrochloric acid, yielded the hydrochloride salt melting at 151–152° C. The U.V. spectrum of this product in ethanol exhibited maxima at 256 and 283 (shoulder) m$\mu$; $\epsilon$=18,550 and 5,680.

The phenacyl-tetrahydroisoquinoline compounds which are used as the starting materials in the examples which follow hereinafter can be prepared in a similar manner using appropriate starting materials.

*Example 2*

1-p-chlorophenacyl-2-methyl - 6,7-dimethoxy - 1,2,3,4-tetrahydroisoquinoline hydrochloride (melting point 152° C.) was, by the method set forth in Example 1, reduced in methanol with sodium borohydride, and the reaction mixture was worked up in the same manner to give the acid oxalate of the second stereoisomer described in Example 1 having a melting point of 123–125° C.

*Example 3*

13 grams of 1-p-nitrophenacyl-2-methyl-6,7-dimethoxy-1,2,3,4-tetrahydroisoquinoline (melting point 120° C.)

were dissolved in 300 ml. of dimethylformamide. To this solution, which was undergoing continual stirring, there was added, portion wise, 2.0 grams of sodium borohydride. The reaction mixture was allowed to stand at room temperature for about 15 hours, following which it was concentrated in vacuo. The residue was then mixed cautiously with dilute hydrochloric acid. After washing with ether, the hydrochloric acid salt solution was made alkali with sodium hydroxide in order to take up the free basic portion in ether. After standing for 15 hours, 1-hydroxy - 1 - p-nitrophenyl-2-[2-methyl-6,7-dimethoxy - 1,2,3,4 - tetrahydroisoquinolinyl - (1)]-ethane crystallized from the ether solution in the form of one of its two stereoisomers. This stereoisomer, after crystallization from isopropyl ether, melted at 150–151° C. The second stereoisomer was obtained, in the form of the acid oxalate, by concentrating the ether mother liquor, dissolving the residue in acetone and mixing same with oxalic acid. After crystallization from methanolether, this compound melted at 121–122° C.

The hydrobromide salt of the second stereoisomer melted at 126–128° C.

*Example 4*

By the reduction of 1-p-chlorophenacyl-2-methyl-6-benzyloxy - 7 - methoxy-1,2,3,4-tetrahydroisoquinoline (melting point 93° C.), using the procedure described in Example 1, there was obtained 1-hydroxy-1-p-chlorophenyl - 2 - [2-methyl-6-benzyloxy-7-methoxy - 1,2,3,4-tetrahydroisoquinolinyl-(1)]-ethane, one isomer of which melted at 130° C. The other isomer of this compound, in the form of its hydrochloride salt, melted at 186° C.

In an additional reduction step, the benzyl group was split off in the following manner:

700 mg. of the isomer melting at 130° C. were dissolved in 50 ml. of methanol and hydrogenated using 100 mg. of 5% palladium-charcoal. When hydrogenation was complete, the catalyst was removed by filtration, the filtrate was concentrated, mixed with alcoholic hydrochloric acid and subsequently with ether until it became turbid. The desired 1-hydroxy-1-p-chlorophenyl-2-[2-methyl - 6-hydroxy-7-methoxy-1,2,3,4-tetrahydroisoquinolinyl-(1)]-ethane hydrochloride precipitated from solution and it was removed therefrom by filtration and dried. This product had a melting point of 178–179° C. and U.V. absorption maxima in ethanol at 284 mμ (ε=3790); in 0.01 N alcoholic sodium hydroxide at 247 and 299 mμ (ε=9,400 and 4,850).

*Example 5*

2.5 grams of the isomer of Example 1, which melted at 120–121° C., were dissolved in 10 ml. of pyridine. After the addition of 10 ml. of acetic anhydride, the mixture was allowed to stand for one hour at water-bath temperature. Thereafter, the mixture was concentrated in vacuo, the residue was dissolved in benzene, the benzene solution was concentrated once again and the residue was mixed with ether. The ether solution was washed with water, dried and concentrated. Subsequently, the residue was dissolved in acetone and mixed with a solution of anhydrous oxalic acid in acetone. The acid oxalate of 1-acetoxy-1-p-chlorophenyl-2-[2-methyl-6,7-dimethoxy-1,2,3,4-tetrahydroisoquinolinyl-(1)]-ethane was caused to separate by the addition of ether. This product was needle-like in appearance and is melted at 80–82° C.

In addition, the following esters were prepared, in a similar manner, from the isomer of Example 1 with a melting point of 120–121° C.:

1-propionyloxy-1-p-chlorophenyl-2-[2-methyl-6,7-dimethoxy-1,2,3,4-tetrahydroisoquinolinyl-(1)]-ethane; melting point of the hydrochloride: 225–226° C.

1-benzoyloxy-1-p-chlorophenyl-2-[2-methyl-6,7 - dimethoxy-1,2,3,4-tetrahydroisoquinolinyl-(1)]-ethane; melting point of the acid oxylate: 136–137° C.; melting point of the hydrochloride: 185–186° C.

1-[β-(4-chlorophenyl)-propionyloxy]-1-p-chlorophenyl-2-[2-methyl-6,7-dimethoxy-1,2,3,4-tetrahydroisoquinolinyl-(1)]-ethane; melting point of the hydrochloride: 175–177° C.

1-(pivaloyloxy)-1-p-chlorophenyl-2-[2-methyl-6,7-dimethoxy-1,2,3,4-tetrahydroisoquinolinyl-(1)]-ethane; melting point of the hydrochloride: 198–201° C.

By the procedure described in Example 1, the following named reduction products were obtained from the corresponding phenacyl compounds:

1-hydroxy-1-p-chlorophenyl-2-[2-allyl - 6,7 - dimethoxy-1,2,3,4-tetrahydroisoquinolinyl-(1)] - ethane, melting point 122° C. (melting point of the starting material: 72° C.).

1-hydroxy-1-phenyl-2-[2-methyl-6,7 - dimethoxy-1,2,3,4-tetrahydroisoquinolinyl-(1)]-ethane, melting point 128° C. (melting point of the starting material: 80–81° C.).

1-hydroxy-1-(3,4-dichlorophenyl)-2-[2 - methyl - 6,7-dimethoxy-1,2,3,4-tetrahydroisoquinolinyl - (1)]-ethane, melting point of one isomer at 136° C. Another isomer of this compound, as the acid oxalate salt, melted at 118–120° C. (melting point of the starting material: 149° C.).

1-hydroxy-1-p-methoxyphenyl-2 - [2 - methyl-6,7-dimethoxy-1,2,3,4-tetrahydroisoquinolinyl-(1)]-ethane, melting point 130° C. (melting point of the starting material: 92° C.).

1-hydroxy-1-p-tolyl-2-[2 - methyl-6,7 - dimethoxy-1,2,3,4-tetrahydroisoquinolinyl-(1)]-ethane, melting point 127° C. (melting point of the strating material: 116° C.).

1-hydroxy-1-p-chlorophenyl-2-[2-methyl-6,7-methylenedioxy-8-methoxy - 1,2,3, 4- tetrahydroisoquinolinyl-(1)]-ethane hydrochloride, melting point 192–194° C. (melting point of the starting material: 113° C.).

1-hydroxy-1-(2-ethyl-4,5-dimethoxy-phenyl)-2-[2-methyl-6,7-dimethoxy-1,2,3,4 - tetrahydroisoquinolinyl - (1)-]-ethane in the form of an oily isomeric mixture. (melting point of the starting material: 110–111° C.).

We claim:
1. A compound having the formula:

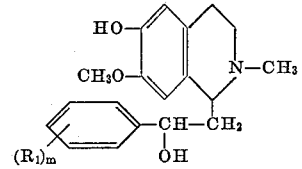

in which $R_1$ is halogen and $m$ is 1 to 3, inclusive.

2. A compound having the formula:

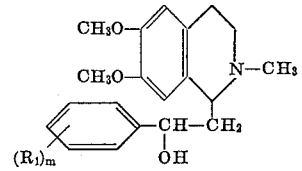

in which $R_1$ is halogen and $m$ is 1 to 3, inclusive.

3. A compound having the formula:

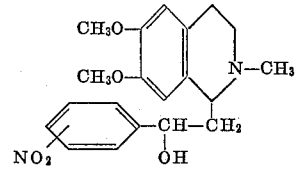

4. 1 - hydroxy - 1 - p-chlorophenyl - 2 - [2 - methyl - 6,7 - dimethoxy - 1,2,3,4 - tetrahydroisoquinolinyl - (1)]-ethane.

5. 1 - hydroxy - 1 - p-chlorophenyl - 2 - [2 - methyl-

6 - hydroxy - 7 - methoxy - 1,2,3,4 - tetrahydroisoquinolinyl-(1)]-ethane.

6. 1 - hydroxy - 1 - (3,4 - dichlorophenyl) - 2 - [2-methyl - 6,7 - dimethoxy - 1,2,3,4 - tetrahydroisoquinolinyl-(1)]-ethane.

7. 1 - hydroxy - 1 - p-nitrophenyl - 2 - [2 - methyl-6,7 - dimethoxy-1,2,3,4 - tetrahydroisoquinolinyl - (1)]-ethane.

8. 1 - acetoxy - 1 - p-chlorophenyl - 2 - [2 - methyl-6,7 - dimethoxy - 1,2,3,4 - tetrahydroisoquinolinyl - (1)]-ethane.

9. 1 - hydroxy - 1 - phenyl - 2 - [2 - methyl - 6,7 - dimethoxy - 1,2,3,4 - tetrahydroisoquinolinyl - (1)] - ethane.

10. 1 - hydroxy - 1 - p-tolyl - 2 - [2 - methyl - 6,7 - dimethoxy - 1,2,3,4 - tetrahydroisoquinolinyl - (1)] - ethane.

References Cited by the Examiner

UNITED STATES PATENTS 3,067,203  12/1962  Besendorf et al. _____ 260—289
3,127,405  3/1964  Schnider et al. ____ 260—286 X

OTHER REFERENCES

Ferron et al., Can. J. Chem., vol. 33, pp. 97–101 (1955).

Govindachari et al., J. Chem. Soc. (London), 1954, pp. 2537–8.

Sasaki et al., Chem. Abstracts, vol. 50, cols. 8695–7 (1956).

NICHOLAS S. RIZZO, *Primary Examiner.*

IRVING MARCUS, *Examiner.*